United States Patent [19]

McCue

[11] 4,364,499
[45] Dec. 21, 1982

[54] GUN RACK FOR POLICE CAR

[76] Inventor: Maurice H. McCue, 10625 St. Henry, St. Ann, Mo. 63074

[21] Appl. No.: 256,004

[22] Filed: Apr. 22, 1981

[51] Int. Cl.³ .............................................. B60R 7/04
[52] U.S. Cl. .......................... 224/42.45 R; 224/42.42; 224/913; 211/64
[58] Field of Search ...................... 224/42.31, 42.45 R, 224/42.42, 913, 912, 275; 211/64; 248/346; 108/44

[56] References Cited

U.S. PATENT DOCUMENTS

| | | | |
|---|---|---|---|
| 2,692,069 | 10/1954 | Winters et al. | 224/275 |
| 2,750,088 | 6/1956 | Agostini | 224/275 |
| 2,775,351 | 12/1956 | Johnson et al. | 211/64 |
| 3,252,637 | 5/1966 | Hart | 224/913 X |
| 3,473,673 | 10/1969 | Porter | 211/64 |
| 3,497,077 | 2/1970 | Sjostrand | 211/64 |
| 3,767,094 | 10/1973 | Sikes | 224/42.42 X |

Primary Examiner—Steven M. Pollard
Assistant Examiner—David Voorhees
Attorney, Agent, or Firm—Polster, Polster and Lucchesi

[57] ABSTRACT

A rack for securely holding a shotgun in the front passenger compartment of a police car or other vehicle is disclosed in which the shotgun, when installed in the rack, is in a generally horizontal position with its barrel pointing forwardly and downwardly and with the stock of the gun overlying the front seat of the car, and in which the shotgun is positively locked in the rack which in turn is firmly secured to the floor of the police car. The rack includes a sturdy welded frame which has a selectively operable gun lock thereon for receiving and positively holding the middle portion of the shotgun (e.g., the receiver) and a muzzle plate in front of the end of the muzzle of the shotgun when the latter is installed in the rack. The muzzle plate has a plug secured thereto and is insertable into the muzzle of the shotgun so that when the gun lock is closed and locked, the gun lock prevents axial, sidewise, and vertical movement of the gun and the muzzle plug prevents sidewise and vertical movement of the muzzle of the gun relative to the rack. Upon opening the gun lock, the police officer may readily remove the gun from the gun rack for use.

10 Claims, 6 Drawing Figures

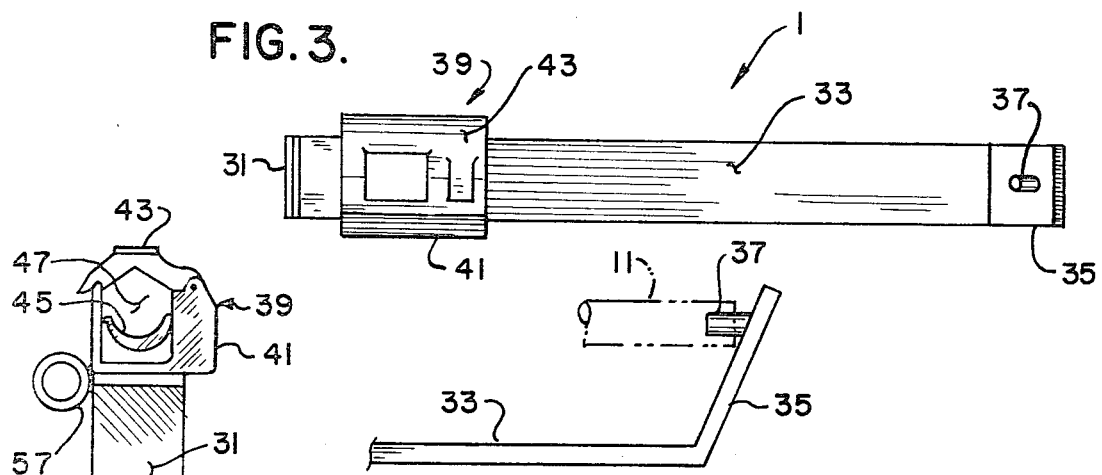
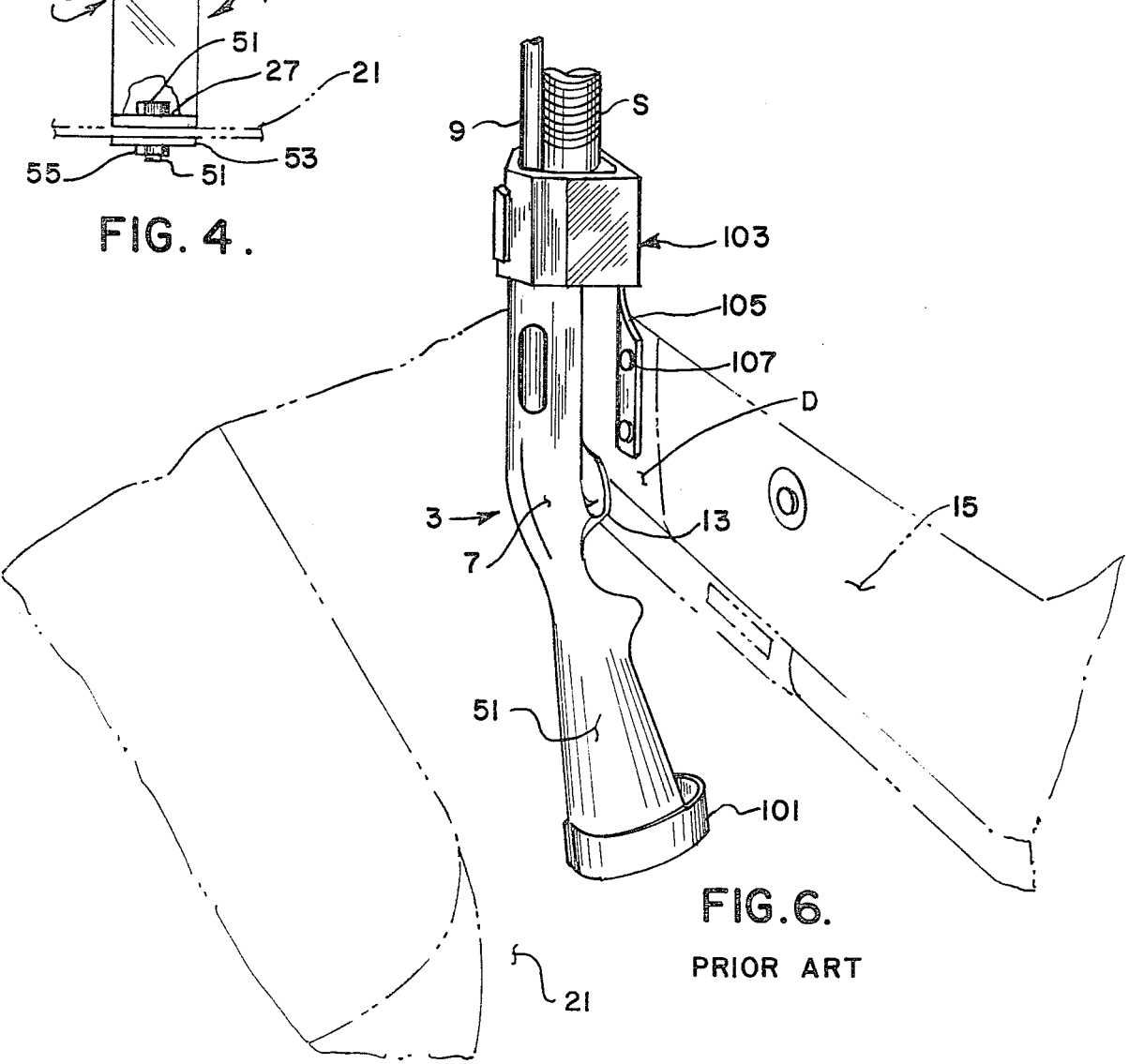

GUN RACK FOR POLICE CAR

BACKGROUND OF THE INVENTION

This invention relates to a gun rack installable in a police car or the like, particularly within the passenger compartment of the police car, for holding a shotgun, riot gun, or other weapon in a secured, locked position within the police car and which, upon opening the gun lock, permits the ready withdrawal of the gun for use by the police officer.

Modern police practice includes equipping patrol cars and unmarked police cars with shotguns or riot guns. These shotguns are conventionally mounted in a rack installed within the front passenger compartment of the patrol car with the gun extending generally vertically with its butt or stock resting in a stock receiving cup mounted on the floor of the car and with the shotgun barrel extending upwardly. A gun lock is secured to the dashboard of the patrol car which when closed and locked surrounds the middle portion of the gun (e.g., the portion of the shotgun immediately in front of the receiver of the gun) thereby preventing substantial axial and sidewise movement of the shotgun relative to the lock and thereby maintaining the butt of the stock within the stock receiving cup. However, with these vertical prior art gun mounts, the barrel of the shotgun extends considerably above the level of the dashboard so that it may readily be seen from the exterior of the police car. Additionally, the barrel of the gun extends up in front of the windshield and, at least to a limited degree, blocks the vision of the driver and the riding officer. Still further, these prior art vertical gun mounting fixtures require inserting fasteners into the dashboard of the car which leaves fastener holes in the dashboard thus reducing the value of the car when sold by the police department. Still further, the dashboards of many cars do not have adequate structural strength to rigidly mount the gun rack and thus the gun rack may physically be ripped from the dashboard. In certain instances, suspects or prisoners have ripped the gun lock from the dashboard of the car enabling the prisoner to arm himself with the shotgun. Additionally, particularly with unmarked police cars, the presence of a shotgun extending above the level of the dashboard clearly identifies the unmarked car as a police car. Still further, when vertical shotgun mounts are installed in certain models of police cars, access to the glove compartment of the police car is prevented and the presence of the shotgun may interfere with the riding officer's use of radio communication equipment which is typically installed within the police car on the transmission tunnel or on the dashboard immediately above the transmission tunnel. Still further, the presence of a vertically mounted shotgun interferes with, and in some instances, prevents a third passenger from riding in the front seat of the patrol car. Also, in the event of a collision of the police car, officers have been injured upon striking the vertically mounted shotgun.

References may be made to the following U.S. patents which are in the same broad field as the shotgun rack of the present invention: U.S. Pat. Nos. 2,692,069, 2,775,351, 3,473,673, 3,497,077, and 3,767,094.

SUMMARY OF THE INVENTION

Among the several objects and features of this invention may be noted the provision of a rack for mounting a shotgun or the like in a police car or other vehicle in which the shotgun is mounted in more or less a horizontal position with the barrel of the shotgun directed forwardly and downwardly beneath the dashboard of the car and in which the muzzle of the shotgun is in close proximity to the front floorboard on the passenger side of the police car and in which the rear stock of the shotgun extends slightly above and rearwardly of the front forward upper edge of the front passenger seat;

The provision of such a gun rack in which the presence of a shotgun secured within a rack of the present invention is not readily viewable from the exterior of the police car;

The provision of such a gun rack which is not secured to and which does not damage the dashboard of the police car;

The provision of such a gun rack with a shotgun locked therein minimizes the chances of a riding officer or a passenger in the patrol car from being injured on the shotgun in event the patrol car is involved in an accident;

The provision of such a gun rack which may be mounted in the trunk of the police car to secure special-purpose weapons, such as high-powered rifle or tear gas launchers;

The provision of such a gun rack which may be readily mounted to the floor of the patrol car (either in the front passenger compartment or in the trunk) and which is easily movable from one car to another substantially without damage to the car; and The provision of such a gun rack which is easily accessible by the police officer when the shotgun is needed, which is dependable in operation, which securely holds the shotgun in its locked position when in the rack, and which is of rugged construction thereby to prevent an unauthorized person from removing the shotgun from the rack or from ripping the rack from its mounted position within the patrol car.

Other objects and features of this invention will be in part apparent and in part pointed out hereinafter.

Briefly stated, this invention relates to a holder or rack for securely mounting a shotgun, riot gun, or other similar weapon in a police car or other vehicle with the barrel of the shotgun pointed generally horizontally and downwardly within the police car. The holder comprises a rigid frame including a generally horizontal base, a front vertical member extending outwardly from the front of the base, and a rear vertical member extending upwardly from the rear of the base with the rear member extending upwardly a somewhat greater distance than the front vertical member. A top member is secured to the upper ends of the front and rear vertical members and extends downwardly and forwardly of the front vertical member. A muzzle member or plate is rigidly secured to the forward, lower end of the top member so as to extend upwardly from the forward end of the top member. The top member further has a gun lock secured thereto which is selectively operable between a closed position and an open position. When the gun lock is open, a shotgun may be inserted in the rack in a stowed position with the barrel of the shotgun pointing downwardly toward the muzzle member with its barrel generally parallel to the top member and with its rear stock extending rearwardly of the lock. The muzzle member of the frame is provided with a muzzle plug which is adapted to be received in the open end of the shotgun barrel when the shotgun is in its stowed position on the rack. Thus, with the lock in its closed or locked position, the shotgun is securely held on the rack by the lock and by the muzzle plug so as to substantially prevent axial, sidewise, and vertical movement of the portion of the shotgun engaged by the lock and so as to prevent sidewise or up and down movement of the muzzle end of the barrel of the shotgun relative to the muzzle plug and the muzzle member.

BRIEF DESCRIPTION OF THE DRAWINGS

FIG. 3 is a top plan view of the gun rack with the gun lock in its closed or locked position;

FIG. 4 is a rear elevational view of the gun rack with a portion broken away to illustrate the bolts for fastening the gun rack to the floor of the police car;

FIG. 5 is an enlarged side elevational view of the front forward portion of the gun rack taken along line 5—5 of FIG. 2 illustrating a muzzle plug rigidly secured to a muzzle plate of the gun rack, the muzzle plug being insertable in the end of the barrel of the shotgun (shown in phantom) when the shotgun is in its stowed position thereby to substantially prevent vertical or sidewise movement of the muzzle of the shotgun relative to the rack; and FIG. 6 is a view generally similar to FIG. 1 illustrating a typical prior art shotgun mounting rack in which the shotgun is held in a generally vertical position.

Corresponding reference characters indicate corresponding parts throughout the several views of the drawings.

DESCRIPTION OF A PREFERRED EMBODIMENT

Figure 1:
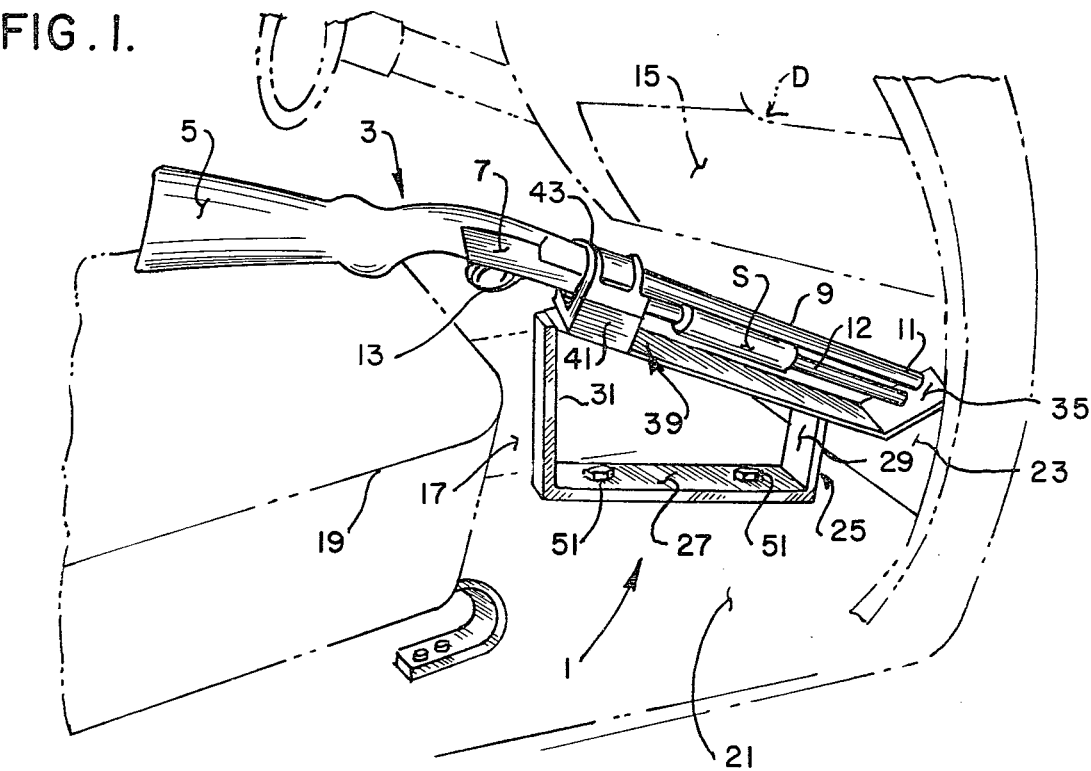
FIG. 1 is a side elevational view of a gun rack of the present invention mounted within the front passenger compartment of a police car with a shotgun mounted within the gun rack in a stowed position and further illustrating (in phantom) the glove compartment, the transmission tunnel, the front passenger seat, and the floor of the police car.

Referring now to the drawings, and particularly to FIGS. 1-5, a shotgun rack or holder of the present invention is indicated in its entirety by reference character 1 for securely mounting a shotgun, a riot gun, or other similar weapon, as generally indicated at 3, within a police patrol car or other vehicle.

As best shown in FIG. 1, shotgun 3 includes a rear stock 5, a receiver 7, and a barrel 9 with the outer end of the barrel or the muzzle being indicated at 11. The shotgun illustrated in FIG. 1 is a pump action shotgun having a tubular magazine 12 parallel to and below the barrel for holding a series of shotgun shells in end-to-end relation and having a slide member S reciprocable in longitudinal direction along the barrel for repeatedly firing the shotgun. The receiver includes a trigger and guard assembly 13.

As shown in phantom in FIG. 1, the police car includes a dashboard D and, on the passenger side of the dashboard, a glove compartment door 15 is provided which is hinged at its bottom and opens downwardly. Normally, glove compartment door 15 is closed and is flush with dashboard D. As is typical, many front engine, rear wheel drive patrol cars include a transmission tunnel 17 substantially dividing the front passenger compartment into a driver's compartment and a passenger compartment. A front seat is indicated at 19 and the seat is typically adjustable for movement in a fore and aft direction on the floor of the police car. As indicated at 21, the police car floor includes a generally flat, horizontal floor portion 21 immediately in front of and below seat 19. The passenger compartment floor typically includes an inclined front floorboard 23 extending upwardly and forwardly from the horizontal floorboard 19. It will be appreciated, however, that in certain models of cars, particularly front engine, front-wheel drive cars, the inclined front passenger floorboard may be substantially eliminated thereby increasing foot space within the passenger compartment.

Figure 2:
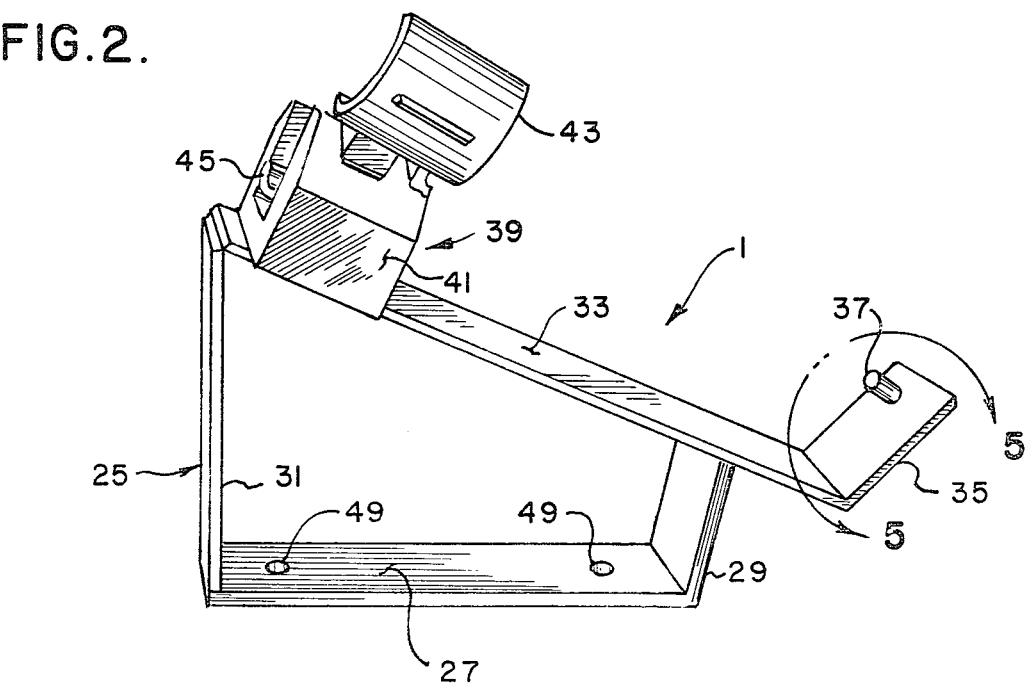
FIG. 2 is a side perspective view of the gun rack with the gun lock in its open position thereby permitting the shotgun to be inserted in or removed from its stowed position in the gun rack.

Gun rack 1 of the present invention includes a rigid frame, as generally indicated at 25. Preferably, the frame is a solid, one-piece weldment of relatively heavy gauge metal which is securely and rigidly welded together. More particularly, frame 25 is shown to comprise a lower horizontal base member 27 which is engageable with the horizontal floorboard 21 in the front passenger compartment of the police car. The frame includes a front vertical member 29 secured (e.g., welded) to and extending generally vertically from the front end of the base member and a rear vertical member 31 secured (e.g., welded) to the rear end of the base member and extending generally vertically therefrom. As best shown in FIGS. 1 and 2, the rear vertical member extends above the level of the front vertical member. A top member 33 is secured or welded to the upper ends of the front and rear vertical members and is inclined generally downwardly and forwardly. The forward end of the top member preferably extends beyond front vertical member 29. However, it will be understood that in vehicles having a generally flat floor (i.e., in vehicles in which inclined front floorboard 23 is not present or is moved substantially forward of the position shown in FIG. 1), the front vertical member may be substantially shorter and moved toward the front end of the top member or may be eliminated entirely. In any event, frame 25, whether of generally trapezoidial shape as shown in FIG. 1, or whether of generally a triangular shape, as described above, is within the broader aspects of this invention.

Further in accordance with of this invention, frame 25 includes a muzzle plate or member, as indicated at 35, rigidly secured to and cantilevered upwardly from the forward end of top member 33. Muzzle plate 35 has a muzzle plug 37 rigidly secured (welded) to the inner face of the muzzle plate so as to extend rearwardly, as best shown in FIG. 5. Further, a gun lock, as generally indicated at 39, is rigidly mounted on top member 33 toward the rear of the top plate. Gun lock 39 includes a body 41 secured to the top plate and has a hinged cover or arm 43 secured thereto and movable between an open position (as shown in FIG. 2) and a closed or locked position, as shown in FIGS. 3 and 4. Gun lock body 41 typically has a pad 45 installed in the lower portion of the gun receiving opening 47 therewithin thereby to cradle and to protect the receiver (or mid-portion) of the gun. As is typical, the gun lock is provided with a locking means for securely and positively holding the hinged arm or cover plate 43 in its closed locked position whereby the body of the gun lock and the closed arm surround the receiver or mid-portion of the shotgun and substantially prevent axial, sidewise, and vertical movement of the shotgun relative to the gun lock. As is typical, the locking means of the gun lock may be either electrically actuated or key actuated thereby to permit locking and unlocking of the gun lock. These gun locks are commercially available and one such gun lock is commercially available from Smith & Wesson, a subsidiary of Bangor Punta. Base member 27 is shown to have a pair of spaced apertures 49 therein. Each of these apertures receives a respective mounting bolt or screw 51.

In accordance with this invention, gun rack 1 may be readily installed in the police car by positioning the gun rack in the desired position on horizontal floor 21 within the front passenger compartment. The location of mounting apertures 49 in base member 27 are then marked on the carpeting of the police car and holes are drilled through the sheet-metal floor 21 of the police car. Then, the gun rack is again positioned in its desired position, apertures 49 are aligned with the holes drilled through horizontal floor 21, and mounting bolts 51 are inserted through apertures 49 and through the drilled holes in the floorboard. Enlarged washers 53 (see FIG. 4) are installed on the outside face of the car floor 21 and are securely held in position by means of nuts 55 screwed on bolts 51. In this manner, the rigid structure of base member 27 and the enlarged washers 53 securely and rigidly mount the gun rack to the floor of the car and effectively prevent any person from manually ripping the rack 1 from the floor of the car.

In use, with the hinge arm 43 of gun lock 39 open (as shown in FIG. 2), shotgun 3 may be readily inserted in the rack by pointing the muzzle 11 of the gun downwardly toward muzzle plate 35 and by inserting the muzzle of the gun onto muzzle plug 37. Then, the midportion or receiver 7 of the gun is cradled in opening 47 of the gun lock and the movable locking arm 43 of the gun lock is moved from its open to its closed position thereby to substantially surround and lock the gun in place within the gun lock. With the locking mechanism of gun lock 39 secured, the gun lock substantially prevents axial, vertical, or sidewise movement of the receiver or mid-portion of the shotgun relative to the gun lock and the muzzle plug 37 prevents sidewise and vertical movement of the muzzle 11 of the gun relative to muzzle plate 35. In this manner, the shotgun 3 is securely and rigidly mounted in gun rack 5.

As shown in FIG. 1, the rear stock 5 of the shotgun extends only slightly above and rearwardly of the front upper edge of front seat 19 and is substantially below the upper level of dashboard D such that the shotgun is not readily viewable from the exterior of the police car. In addition, the shotgun does not protrude above the upper level of the dashboard and thus does not block the vision of either the driver or the passenger in the police car. Still further, because of the low mounting position of the shotgun relative to the seat, the riding officer in the passenger compartment of the police car has ready access to the communication equipment installed on the transmission tunnel 17 of the police car. Still further, it will be recognized that a third passenger may be accommodated on the front seat substantially without interference from the rear stock 5 of the shotgun.

In the event it becomes necessary for the police officer to remove shotgun 3 from rack 1 of this invention, gun lock 39 is unlocked (either by energizing an electrical unlocking device or by inserting a key and unlocking the gun lock), by opening gun lock cover 43, and by withdrawing the gun from the rack in a generally rearwardly direction parallel to the axis of the barrel of the gun, as it is illustrated in FIG. 1.

It will also be understood that with the shotgun 3 installed in the mounting rack 1 of the present invention in its position generally as illustrated in FIG. 1, the shotgun does not project upwardly in front of the dashboard and thus police officers riding in the front seat of the car are not as likely to strike the gun or the gun rack in the event of a collision of the police car.

Referring to FIG. 5, an optional tube 57 may be secured to the side of frame 25 adjacent top member 33 for mounting a nightstick or baton, or for holding a flashlight.

It will be appreciated, however, that the gun rack 1 of the present invention may be utilized in virtually any type of vehicle and need not be mounted in the passenger compartment. For example, rack 1 may be mounted in the trunk of a patrol because it holds the gun in generally horizontal position where it may be utilized to hold special weapons, such as tear gas launchers or high powered rifles.

In FIG. 6, a prior art shotgun mount or rack is illustrated in which shotgun 3 is held in vertical position with its rear stock or butt 5 received in a cup 101 secured to the floor 21 of the car. A gun lock 103, similar to lock 39 described above, is supported on a dash mounted from 105 bolted to dashboard D by bolts 107.

In view of the above, it will be seen that the several objects and features of this invention are achieved and other advantageous results obtained.

As various changes could be made in the above construction without departing from the scope of this invention it is intended that all matter contained in the above description as shown in the accompanying drawings shall be interpreted as illustrative and not in a limiting sense.

What is claimed is:

1. A holder for securely mounting a weapon in a vehicle in such a position that the barrel of the weapon extends along an axis other than a vertical axis, said holder comprising a frame including a generally horizontal base and a top member positioned above said base, a muzzle member secured to the forward end of said top member, a gun lock secured to the top member rearwardly of said muzzle member, and a muzzle plug secured to said muzzle member and extending toward said lock, said gun lock being selectively operable between an open and a closed position, with said gun lock in its open position said weapon being insertable into said rack with a portion of said weapon received in said gun lock and with the muzzle of said weapon receiving said muzzle plug so that with said gun lock in its locked position, said gun lock substantially prevents axial, sidewise and vertical movement of the weapon relative to said gun lock and so that said muzzle plug prevents substantial sidewise and vertical movement of the muzzle of the weapon relative to said frame.

2. The holder of claim 1 wherein said muzzle plug is insertable in the barrel of said shotgun so that said shotgun must be moved axially rearwardly before the shotgun can be moved laterally from said gun rack.

3. The holder of claim 2 wherein said frame includes a base member engageable with a horizontal support, and means for attaching said base member to said horizontal support.

4. A gun rack for installation in the front passenger compartment of a police car or the like so as to securely mount a shotgun or other weapon within the police car thereby to permit the shotgun to be safely and conveniently carried in a stowed, generally horizontal position within the police car and to permit the police officer to readily remove the shotgun from the rack when required, said shotgun having a rear stock, a mid-portion, and a barrel extending from the mid-portion, said police car having a front seat, a front horizontal floor generally in front of said seat, said rack including a frame adapted to be securely fastened to said front horizontal floor in front of said seat, said frame including a muzzle plate at the forward end of said frame and a gun lock spaced rearwardly from said muzzle plate, said muzzle plate further having a muzzle plug thereon facing generally toward said gun lock, said gun lock being selectively operable between an open and locked position, said shotgun being received in said rack when said lock is in its open position with the mid-portion of said shotgun being received in said lock and with the muzzle of the barrel of said shotgun receiving said muzzle plug, whereby with said lock in its locked position, said gun lock substantially prevents vertical, horizontal, and sidewise movement of the mid-portion of the shotgun relative to the lock and said muzzle plug received within the muzzle of said shotgun substantially prevents sidewise and vertical movement of the muzzle of the shotgun relative to the rack.

5. The gun rack of claim 4 wherein said frame includes a base member engageable with the horizontal front floor of said police car and fastener members engageable with said base member and said police car floor for to securely mounting said rack within said car.

6. The gun rack of claim 4 wherein said shotgun, when in its stowed position, extends rearwardly of said lock and of said frame, slightly above the level of the front edge of said front seat and wherein the barrel of said shotgun extends generally forwardly and downwardly within the police car.

7. A rack for installation in the front passenger compartment of a vehicle so as to mount a weapon securely in a generally horizontal position within the vehicle thereby to permit the shotgun to be safely and securely carried within the vehicle and yet to permit ready access to the shotgun when required by authorized personnel, said shotgun having a rear stock, a mid-portion, and a barrel extending from the mid-portion, said vehicle having a front seat and a front horizontal floor generally in front of said front seat, said rack including a frame adapted to be mounted to the front floor of said vehicle, said frame including a generally horizontal base plate engageable with and securable to said front floor of said vehicle, a front vertical member rigidly secured to and extending upwardly from the front of said base plate, a rear vertical member rigidly secured to and extending upwardly from the rear of said base plate, said rear vertical member extending upwardly above the level of the upper end of said front vertical member, a top plate rigidly secured to the upper ends of said front and rear vertical members and extending downwardly and forwardly beyond said front vertical member, and a muzzle member secured to the forward, lower end of said top member, said top member having gun lock means securely mounted thereon and said muzzle member having a muzzle plug mounted on one face thereof and extending toward said gun lock, said gun lock being selectively operable between a closed position and an open position, said gun lock when in its open position permitting said shotgun to be readily inserted in a stowed position within said rack with the barrel of said shotgun pointing generally forwardly and downwardly toward said muzzle member and with the barrel of said shotgun receiving said muzzle plug, said lock being engageable with said mid-portion of said shotgun whereby said lock positively prevents substantial sidewise, vertical and axial movement of the mid-portion of said shotgun and said muzzle plug prevents substantial sidewise and vertical movement of the muzzle of said shotgun relative to said rack.

8. The device of claim 7 wherein said muzzle plug requires substantial rearward axial movement of said shotgun before said shotgun is removable from said holder.

9. The rack of claim 8 wherein said rack is positioned so that the rear stock of said shotgun is directed toward the driver seat of said vehicle.

10. The device of claim 9 wherein said shotgun includes a rear stock, said frame being positioned to direct said stock toward a driver position of a vehicle.

* * * * *